United States Patent [19]

Hayata et al.

[11] Patent Number: 5,893,097
[45] Date of Patent: *Apr. 6, 1999

[54] DATABASE MANAGEMENT SYSTEM AND METHOD UTILIZING A SHARED MEMORY

[75] Inventors: Hiroshi Hayata; Yoshiki Watanabe, both of Kanagawa, Japan

[73] Assignee: Fuji Xerox Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 634,605

[22] Filed: Apr. 18, 1996

[30] Foreign Application Priority Data

Aug. 29, 1995 [JP] Japan .................................... 7-243672

[51] Int. Cl.$^6$ ...................................................... G06F 17/30
[52] U.S. Cl. ................. 707/10; 395/200.44; 395/200.45; 395/200.46
[58] Field of Search .................................... 395/608, 610, 395/200.09, 704, 200.12, 614, 684, 672, 840, 200.44, 200.45, 200.46; 707/10, 104

[56] References Cited

U.S. PATENT DOCUMENTS

| | | | |
|---|---|---|---|
| 5,432,034 | 7/1995 | Cohen-Levy et al. | 707/10 |
| 5,553,242 | 9/1996 | Russell et al. | 395/200.12 |
| 5,566,302 | 10/1996 | Khalidi et al. | 395/200.09 |
| 5,566,349 | 10/1996 | Trout | 395/840 |
| 5,592,664 | 1/1997 | Starkey | 395/614 |
| 5,596,745 | 1/1997 | Lai et al. | 395/614 |
| 5,617,570 | 4/1997 | Russell et al. | 395/684 |
| 5,619,685 | 4/1997 | Schiavone | 395/200.44 |
| 5,625,795 | 4/1997 | Sakakura et al. | 395/200.45 |
| 5,636,376 | 6/1997 | Chang | 395/704 |
| 5,644,768 | 7/1997 | Perival et al. | 395/672 |
| 5,717,950 | 2/1998 | Yamaguchi et al. | 395/200.45 |
| 5,745,703 | 4/1998 | Cejtin et al. | 395/200.46 |
| 5,765,166 | 6/1998 | Gotfreid et al. | 707/104 |

FOREIGN PATENT DOCUMENTS 5-61662  9/1985  Japan .

OTHER PUBLICATIONS

"Building Object Oriented Database Systems," by Morgan Kaufman Publishers, 1992, Chapter 18, pp. 411–446.
"Inside Windows NT," by Helen Custer, 1993, pp. 188–193.

*Primary Examiner*—Thomas G. Black
*Assistant Examiner*—Frantz Coby
*Attorney, Agent, or Firm*—Oliff & Berridge, PLC

[57] ABSTRACT

A database management system is provided to reduce the process time required for data sharing between the server process and the client process. When the client process sends the data reading command to the server process, the server process reads the page specified by the command from the database file, writes the page in the sharing memory device that includes the mapped file and the page buffer and sends the offset that specifies the page within the region in the mapped file to the client process. The client process maps the logic address of the access space in its process to the region specified by the offset to enable accessing of the page written in the page buffer.

14 Claims, 7 Drawing Sheets

DATABASE MANAGEMENT SYSTEM AND METHOD UTILIZING A SHARED MEMORY

BACKGROUND OF THE INVENTION

1. Field of the Invention

The present invention relates to a database management system in which data read from the database are shared by the server process and the client process. In particular, the present invention relates to an object oriented database management system that utilizes a page server architecture.

2. Description of Related Art

In a database management system in which separated data is managed by a server process and a client process, a page server architecture is utilized where the data is managed as a unit (page) consisting of a certain amount. In the page server architecture, the server process manages the data file per page and upon receiving a request from the client process, the server process reads the page requested in the database files and transfers each page to the client process. Then, the client process interprets or updates the contents of the page according to the request from the application program and executes the process from the application program.

The page server architecture is well known and disclosed in "Building Object Oriented Database Systems", by Morgan Kaufmann Publishers (1992, Chapter 18, pp411–446 and more particularly pp415–417), the subject matter of which is incorporated herein by reference.

In the conventional page server architecture, the server process and the client process share each page of data. A method in which data is transferred between the server process and the client process based on the remote procedure call (RPC) is disclosed in the above document on pp 420–422.

A more general structure of a conventional object oriented database management system based on the conventional page server architecture is shown in FIG. 9.

In the database management system of FIG. 9, when the client process 100 sends a page reading command to the server using the communication management unit 101 to read the required page, the communication management unit 201 of the server process 200 executes transactions such as exclusive control of the reading of the page at the transaction management unit 202 and performs data reading process at the page buffer management unit 203.

During the page reading process, the page in question from the database file 205 is read by the desk input/output unit 204. The page buffer management unit 203 stores the data of the page in the page buffer 207 of the server process 200. The data read from the database file 205 is sent to the client process 100 which is the requester of the data using the communication management unit 201.

In the client process 100, the communication management unit 101 receives the sent data. The page buffer management 102 stores the data in the page buffer 103 of the client process 100 and the application program 104 executes necessary processes such as reading the data that is stored in the page buffer 103.

The page stored in the database file 205 is transferred between the server process 200 and the client process 100 and is stored in the respective page buffers 103, 207 enabling sharing of the data between the server process 200 and the client process 100. If another client process (or even a plurality of other client processes) requires reading of the same data, sharing of data is enabled by the server process 200 transferring the data to the client process.

In the page server architecture where the requested data is transferred from the server process, the storing of data to the buffer of both client process and server process is executed in RPC. This causes a problem that the processing time is too long to transfer data between the client process and the server process.

Because of this, a remote file access apparatus is proposed in which an effectiveness of the data maintained in the client process and the server process is determined. If it is determined to be effective, the number of transfer processing is reduced by declaring the data transfer unnecessary. Thus, the traffic overhead is reduced and the transfer processing time is improved as discussed in Japanese Laid-Open Patent Publication Hei 5-61662, the subject matter of which is incorporated herein by reference.

As explained above, in the database system in which the client process and the server process share the data, the process time required for sharing the data between the server process and the client process is reduced.

To cope with such a problem, with the conventional remote file access apparatus, the number of data transfers between the server process and the client process is decreased to reduce the process for sharing data and to speed up the sharing of data.

SUMMARY OF THE INVENTION

The present invention aims to reduce the processing time required for data sharing by improving the method of data sharing, which is different from the method in which the number of data sharing process is decreased.

In the database management apparatus of the present invention, a shared memory device is provided to be shared between the client process (client process part) and the server process (server process part) so that the client process can access the data that the server process reads from the database and writes in the shared memory device.

In other words, when the client process sends a data reading command to the server process, the server process reads the specified data from the database, writes it in the shared memory device and sends the region identifier that specifies the data in the region of the sharing memory device to the client process. Then, the access region in the client process is mapped into the region of the shared memory device specified by the region identifier to enable access to the written data in the region of the shared memory device.

The shared memory device may include an internal memory (real memory) that maintains the data read from the database which are accessed by the client process and an external memory (secondary memory) that maintains the same data as the internal memory. The address indicating the region of the external memory in which data is written as a region identifier is sent from the server process to the client process. The access to the written data in the region of the shared memory device is enabled by mapping the region of the external memory indicated by the address of the external memory to the region in the internal memory indicated by the logic address used by the client process to access the data.

In sending the reading command in the client process, a determination is made whether necessary data is mapped into the client process. If the mapping is not performed, the reading command is sent to the server process.

The client process manages the data mapped to itself based on the information containing the data identifier of the mapped data and the logic address of the internal memory in the client process and the above determination is executed based on the information.

In writing the data into the shared memory device in the server process, a determination is made whether the specified data is already written in the shared memory device. If the data is not written, the data is read from the database and written in the shared memory device.

The server process manages data in the shared memory device based on the information including the data identifier that specifies the data written in the shared memory device, the address indicating the region of the external memory that maintains the data and identifier of the client process to which the data is mapped. The determination is executed based on this information.

Moreover, if the entry that stores the above information to be used for data management is full, the server process releases the entry with low data priority based on the data identifier that specifies the data written in the shared memory device and the identifier of the client process to which the data is mapped and provides the entry for the data management for the new reading command.

A mechanism used to map the data in the shared memory device is provided by UNIX or Windows NT as disclosed in "Inside Windows NT", ASCII Publishing Co., 1992, pp188–193, the subject matter of which is incorporated herein by reference. Access of the same data stored in physical memory by a multiplicity of processes is enabled by mapping part of the virtual memory space of each process as mapped files on the physical memory.

In the present invention, sharing of the data with shorter processing time than the method in which data are transferred by RPC is enabled by implementing the above mechanism. The amount of memory used for necessary operation can be reduced by integrating the cache region of the server process and the buffer region of the client process as one mapped file.

As an example of the present invention, one server process and one or more client process include one information processing apparatus (host machine). The data is shared by utilizing a memory sharing mechanism between the server process and the client process using mapped files. As another example, the server process and the client process include different information processing apparatuses that are connected to each other. The data is shared by utilizing a memory sharing mechanism between the server process and the client process or using mapped files. In the above structure, the internal memory section of the shared memory device is provided in each of the client process apparatus and the server process apparatuses. The data maintained in each internal memory is mapped to the data maintained in the external memory.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
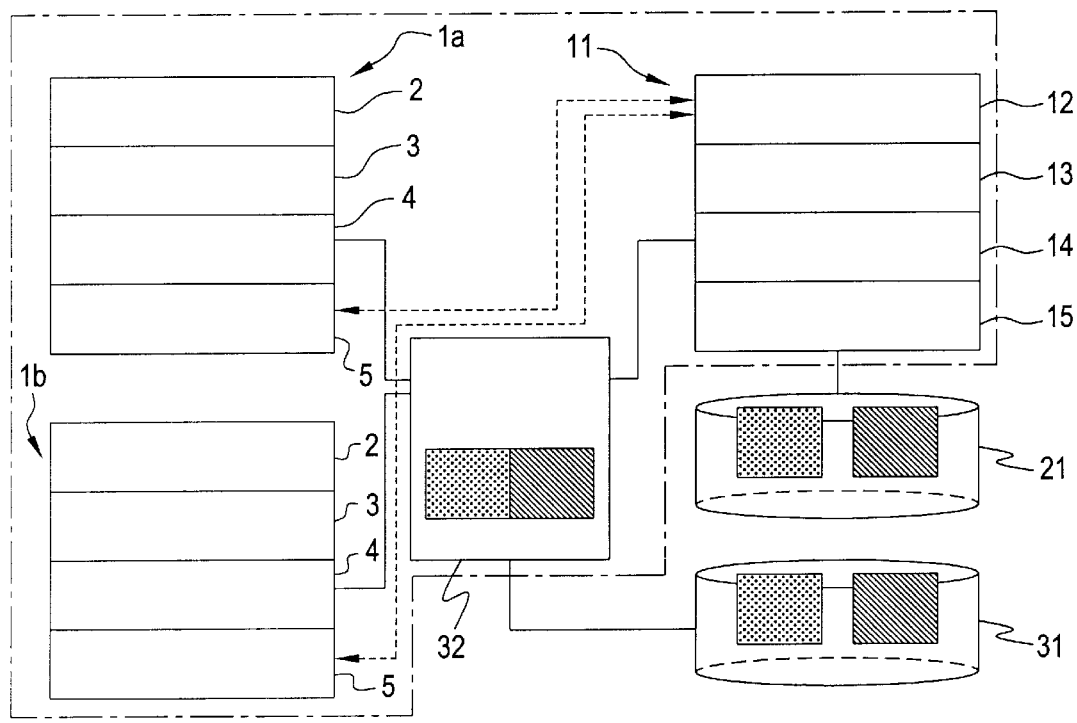
FIG. 1 is the structure of the database management system of the present invention.

An embodiment of the database management system of the present invention will now be described. As shown in FIG. 1, this database management system includes two client process 1a, 1b and one server process 11 in the same information processing apparatus. The server process 11 manages the database file 21.

A mapped file 31 and an internal memory 32 are provided in the database management system. The shared memory device includes the mapped file 31 and the internal memory 32. The mapped file 31 includes an external memory apparatus such as a magnetic disk device that is attached to the information processing apparatus. The internal memory 32 includes the main memory device in the information processing apparatus.

The data, which is read one page at a time from the database file 21 is written in the mapped file 31 and the internal memory 32. The physical address (offset: BufOffset) in the data storage region and the logical address (MapAddr) by which the client process 1a, 1b accesses the corresponding data storage in the internal memory 32 are made to correspond one-to-one by mapping in the mapped file 32.

Each of the client process 1a, 1b includes an application program 2, an object management unit 3, a page buffer management unit 4 and a communication management unit 5 to execute predetermined processes for the data read a page at a time from the database 21 by the application program 2 under management of the object management unit 3.

The page buffer management unit 4 has a structure as will be described below in reference to FIG. 3 to manage a page mapped to itself.

The communication management unit 5 controls communication between the client process 1a, 1b and the server process 11 and executes sending commands to the server process 11 and reception of information sent from the server process 11.

The server process 11 includes a communication management unit 12, a transaction management unit 13, a page buffer management unit 14 and a disk input/output unit 15 to execute page reading and writing for the data file 21 based on the command from the server process 11.

The communication management unit 12 performs communication control between the server process 11 and the client process 1a, 1b, receives commands for the server process 11 and sends information to the server process 11 while the transaction management, unit 13 executes transaction management such as exclusive control for the data reading command from the client process 1a, 1b.

The page buffer management unit 14 has a structure as will be described below with reference to FIG. 2 to manage a page read from the database file 21.

The disk input/output unit 15 reads and writes for the database file 21 while at the same time executing writing for the shared memory 31, 32 under the management of the page buffer management unit 14.

Figure 2:
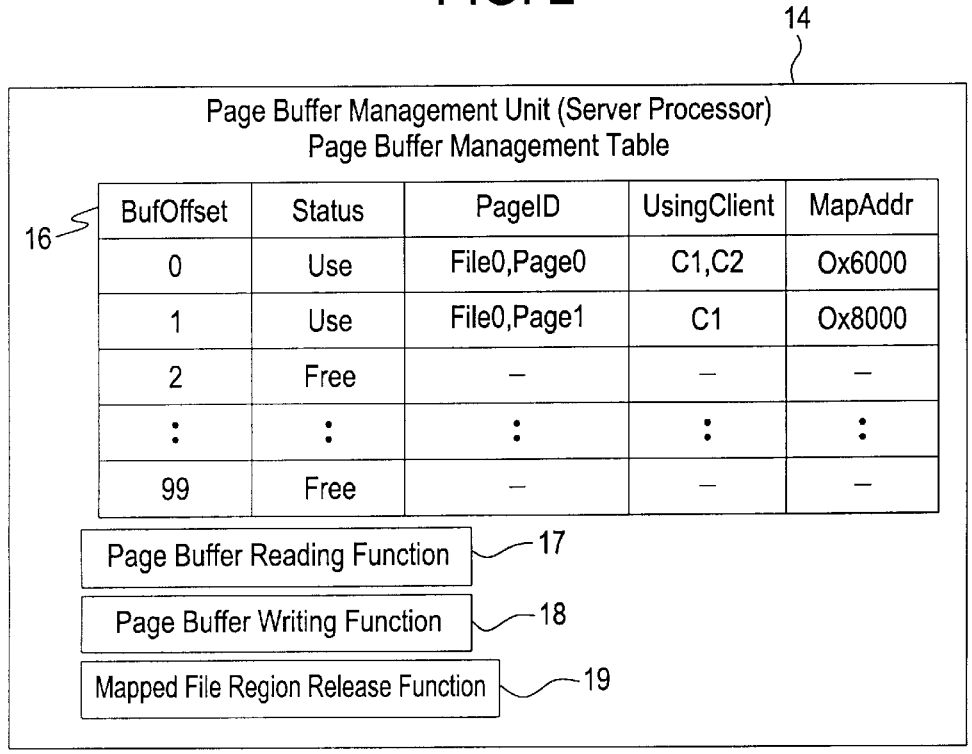
FIG. 2 is the structure of the page buffer management unit provided in the server process.

As shown in FIG. 2, the page buffer management unit 14 of the server process 11 includes a page buffer management table 16, a page buffer reading function 17, a page buffer writing function 18 and a mapped file region releasing function 19.

The page buffer management table 16 maintains information to manage the condition of the page read from the database file 21 with each entry of the page buffer management table 16 showing the condition of each page.

In other words, each entry of the page buffer management table 16 includes the offset "BufOffset" indicating the physical memory region storing the page of the mapped file, "Status" indicating the data condition in each page offset, "PageID" to identify the page stored in the shared memory 31, 32, "UsingClient" to identify the client using the page and the logic address "MapAddr" in the virtual process space of the server process 11 of the page mapped into the server process 11.

For example, the data of "Page0" in "File0" indicated in the first entry of the page buffer management table 16 is stored in the page offset 0 of the mapped file 31, which is used by each client process indicated by identifiers C1 and C2 and are mapped into address 0x6000 in the server process 11. In other words, these data are cached and shared by the server process 11 and two client processes.

Similarly, the data of "Page1" in "File0" indicated by the next entry is stored in the page offset 1 of the mapped file 31, which are used by the client process of the identifier C1 and are mapped into the address 0x8000 of the server process 11.

The page buffer reading function 17, the page buffer writing function 18 and the mapped file region releasing function 19 are executed based on the information in the management table 16. The page buffer reading function 17 causes the disk input/output unit 15 to read the page. The page buffer writing function 18 causes the disk input/output unit 15 to write the page and the mapped file region releasing function 19 to release entry of the management table 16 as will be described below.

Figure 3:
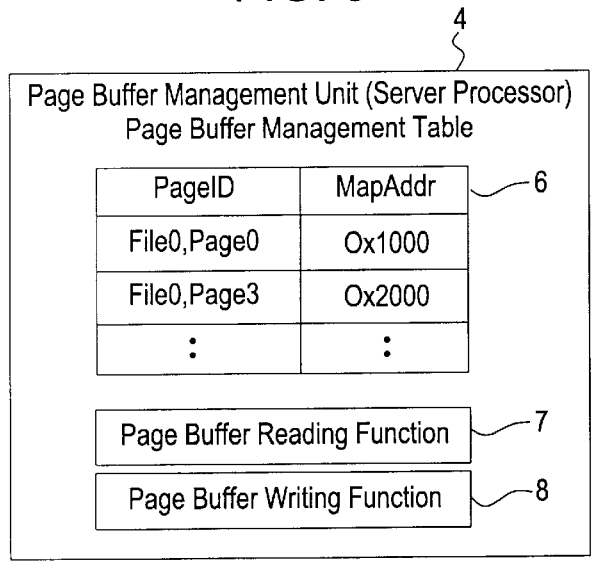
FIG. 3 is a structure of the page buffer management unit provided in the client process.
Figure 9:
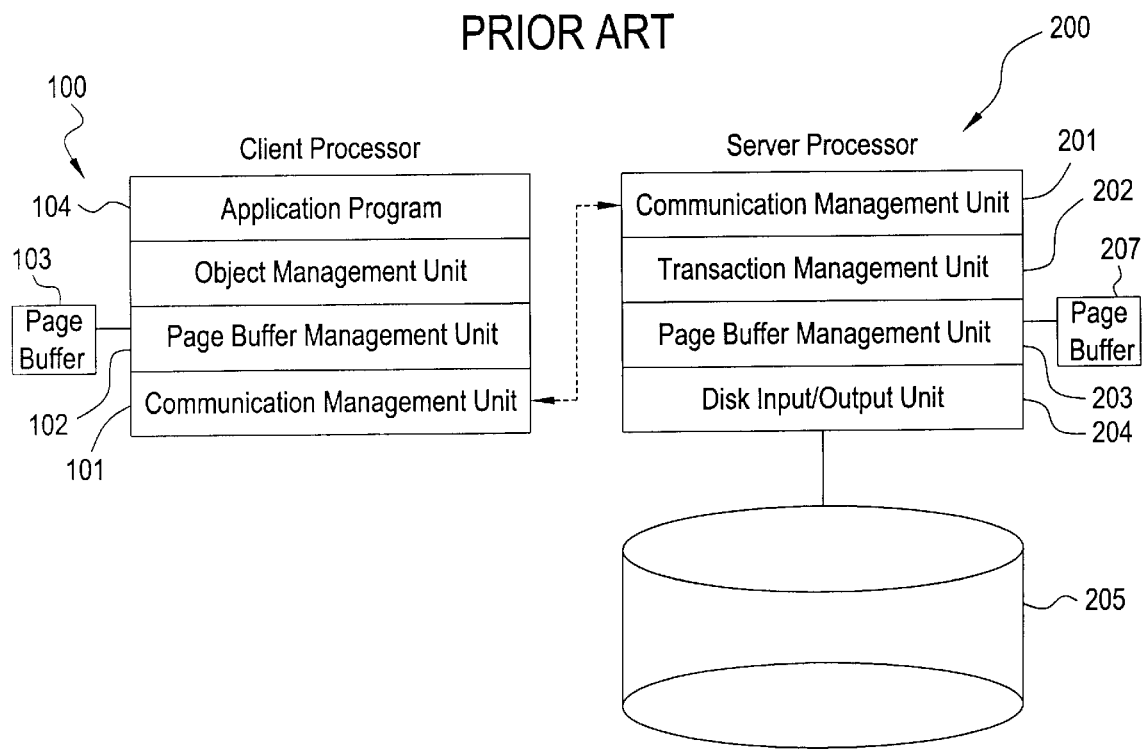
FIG. 9 is a drawing showing a convention database management system.

As shown in FIG. 3, the page buffer management unit 4 of the client process 1a, 1b includes a page buffer management table 6, a page buffer reading function 7 and a page buffer writing function 8.

The page buffer table 6 maintains the information used to manage the condition of the page mapped to the client process. Each entry of the page buffer table 6 indicates the condition of each page.

In other words, each entry of the page buffer management table 6 includes "PageID" that is stored in the internal memory 32 and which identifies the page mapped to the client process in the page and the logic address "MapAddr" of the page being mapped in the virtual process space of the client process.

For example, the data of "Page0" in the "File0" indicated in the first entry of the page buffer management table 6 is mapped to the address 0x1000 in the client process.

The database management system shares the internal memory 32 by sharing the mapped file 31. Hence, the same page is not maintained by the client process and the server process. This results in a one-half reduction of the amount of memory used to store pages at the same time, reflecting the updated data in the client process 1a, 1b to the server process 11.

In the database management system having the above structure, when the client process sends the reading command from the communication control unit 5 to read necessary pages, the server process 11 receives the command at the communication management unit 12, executes transactions as exclusive control of page reading at the transaction management unit 13 and executes page reading at the page buffer management unit 14. In the process of page reading, the data of the page in question in the database file 21 is read by the disk input/output unit 15 and the page is stored in the page buffer (internal memory) 32 in in which the mapped file 31 and a portion of the mapped file 31 is mapped to the virtual process space of the server process 11.

Then the offset of the mapped file 31 that maintains the above page is sent from the communication management unit 12 to the client process which is the requester. The client process that receives the offset information from the communication control unit 5 maps the offset information of the mapped file 31 to which the page buffer management 4 is notified to the virtual space in the client process and makes it the page buffer. Hence, the client process reads the page maintained in the page buffer 32 and executes the process by the application program 2.

Therefore, the time required to process the data sharing process is substantially reduced compared with prior art methods in which a page is transferred from the server process to the client process because the page read from the database file 21 is shared merely by the server process 11 sending the mapped file offset to the client process and by the client process mapping the notified offset information.

If another client process requires reading of the same page, the sharing of data may be achieved by the server process 11 sending the mapped file offset to the client process and by the client process mapping the notified offset information.

During the reading process of the page described above, the page buffer management table 6 of the client process 1a, 1b and the page buffer management table 16 of the server process 11 are used as will be described below.

If the client process needs to access a certain page in the page buffer management table 6 for which there is no entry in the identifier "PageID", the client process sends a reading command including the "PageID" in question to the server process 11.

Upon the server process receiving the command, if entry of the page corresponding to the "PageID" in question exists in the page buffer management table 16 and if the "Status" is "Use" indicating that the entry is being used, use is made of the offset "BufOffset" of the entry of the mapped file offset and returns it to the client process that is the requester.

On the other hand, if the entry does not exist, the server process searches for an entry that is an empty region, makes the "Status" of the entry "Use" to indicate that the entry is being used in the requested page, maps the offset "BufOffset" of the entry to the process space of the server process 11 as the mapped file offset and reads the contents of the page specified by the "PageID" from the database file 21 to the mapped address. Then, the server process 11 makes the offset "BufOffset" of the entry a mapped file offset and returns it to the client process that is the requester.

Upon receiving the mapped file offset, the client process maps the mapped file offset in its own process space to enable access to the page being read and records "PageID" of the page and the mapped logic address "MapAddr" in the page buffer management table 6.

On the other hand, during the writing process of a certain page from the client process to the database file 21, the page buffer management table 6 of the client process 1a, 1b and the page buffer management table 16 of the server process 11 are used as follows.

In other words, if the client process needs to write a certain page and if the entry of the identifier "PageID" of the page in question exists in the page buffer management table 6, the client process sends a writing command including the "PageID" to the server process 11. If the entry corresponding to the page buffer management table 6 does not exist, a writing command is not sent and the process is not executed.

Upon the server process 11 receiving the command, if the entry of the page corresponding to "PageID" in question exists in the page buffer management table 16, the contents of the page specified by the logic address "MapAddr" of the entry on the database file 21 is written to the server process 11 and returns the signal to the client process indicating the completion of the writing process.

A detailed explanation of the page buffer management unit 4, 14 during the page reading process and the page writing process will now be described with reference to FIGS. 4–8.

Figure 4:
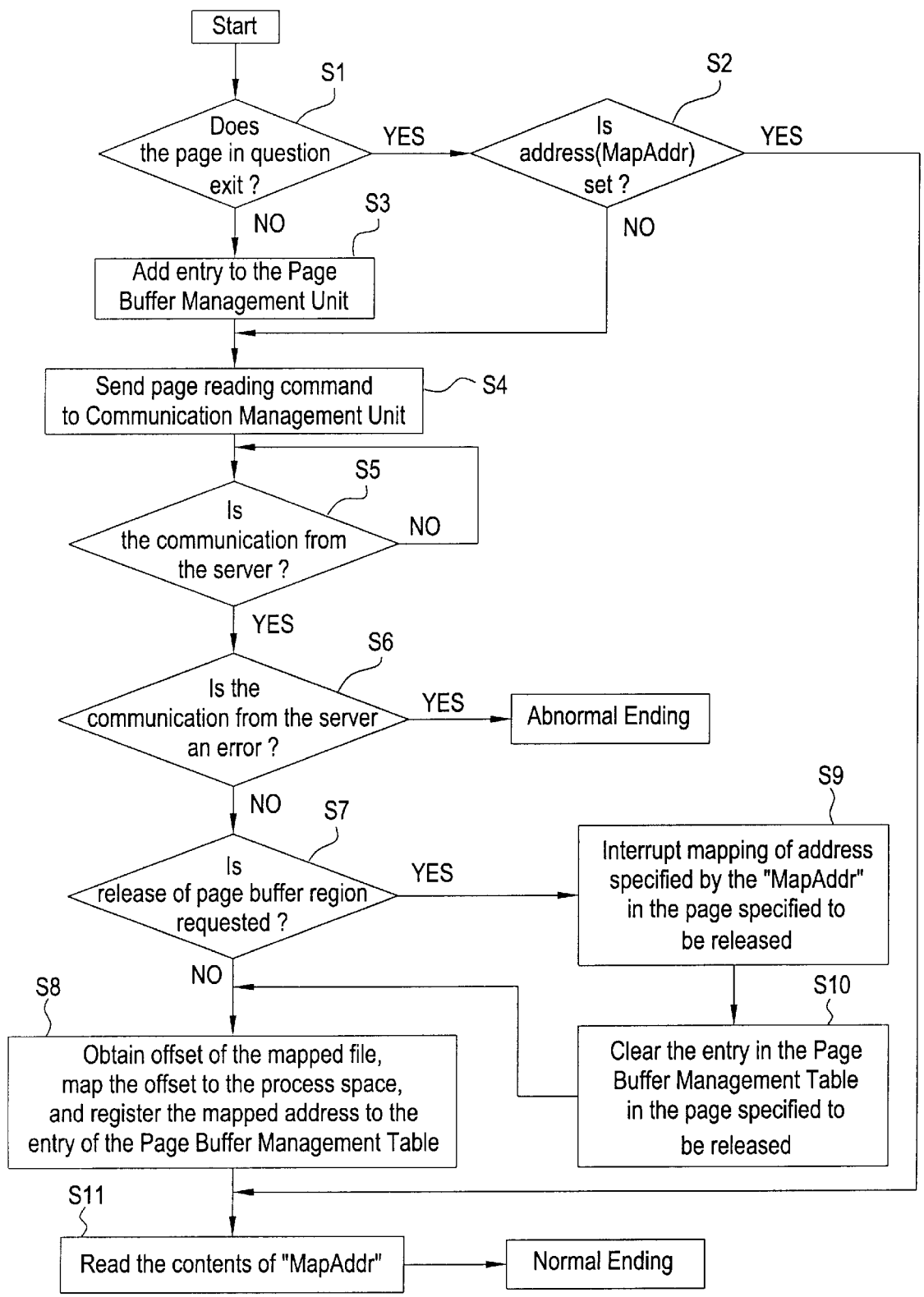
FIG. 4 is a flowchart describing the steps of reading a page in the page buffer reading function of the client process.

During the page reading process, the page buffer reading function 7 that is provided in the page buffer management unit 4 of the client process executes the process according to the steps of FIG. 4.

In other words, if a certain page needs to be accessed, a determination is made whether the entry of the page in question exists in the page buffer management table 6 (step S1). If the entry exists, verification is made as to whether the logic address "MapAddr" is set for the entry (step 2). As a result, if the "MapAddr" is set, the contents of the page are already read in the page buffer 32 that is indicated by the "MapAddr". The contents are read and the process is completed (step S11).

On the other hand, if the entry does not exist or "MapAddr" is not set, the reading command, including Pager ID number needed is sent to the server process 11 using the communication management unit 5 (step S4). If the entry does not exist in the page buffer management table 6, the entry is added to the page buffer management table 6 prior to sending the command (step S3).

Then, upon receiving the return signals from the server process 11 for the reading command sent in its own communication control unit 5 (step S5), the client process maps the mapped file offset that is obtained from the return signals to its own process space and registers the mapped logic address to the "MapAddr" of the corresponding entry in the page buffer file management table 6 (step S8). Then, the process is completed by reading the content of the page by the logic address (step S11).

If the return signal is in error (step S6), the current process is terminated at that time as an abnormal process. If a request to release the region of the page buffer 32 from the server process 11 is contained in the return signal, the page identifier "PageID" searches for the entry of the page requested for release in the page buffer management table 6, interrupts mapping of the mapped file by the "MapAddr" of the entry (step S9) and clears the entry to enable an unused condition (step S10).

Figure 8:
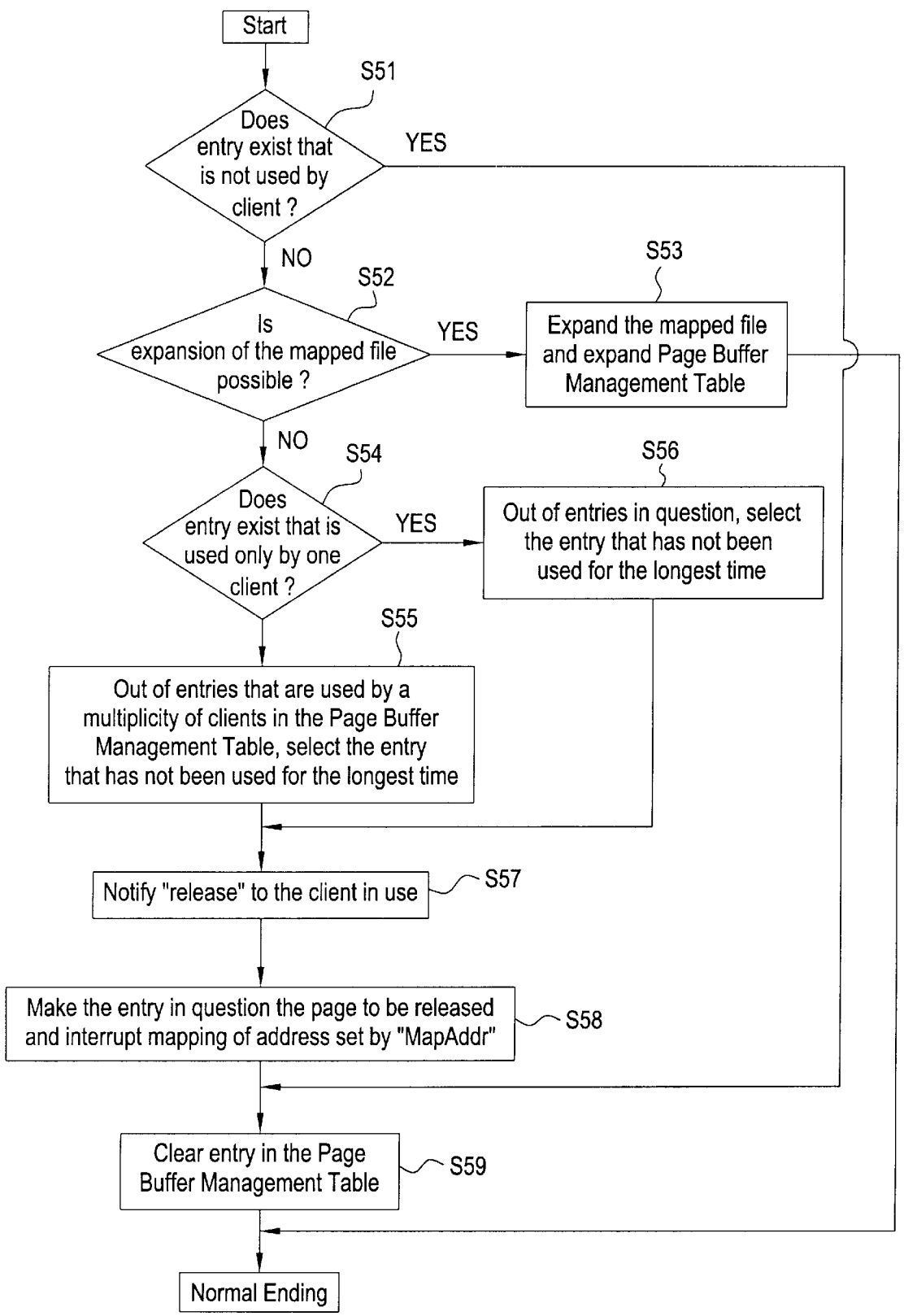
FIG. 8 is a flowchart describing the steps of releasing using the mapped file region release function of the server process.

The release request is sent to the client process 1a, 1b in conjunction with the process to secure the entry and the page buffer 32 for the server process 11 to manage a new page, which will be described with reference to FIG. 8.

Figure 5:
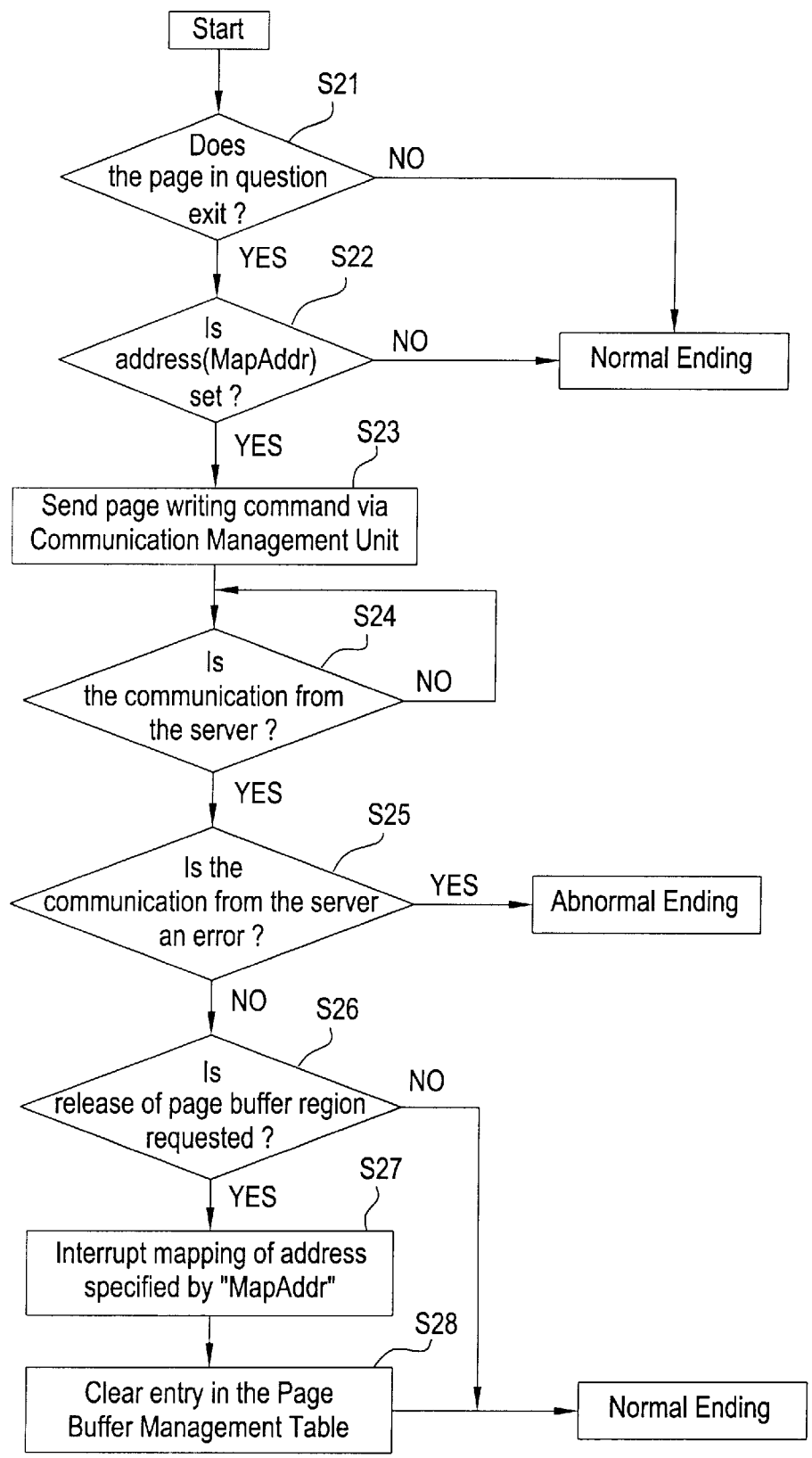
FIG. 5 is a flowchart describing the steps of writing a page in the page buffer reading function of the client process.
Figure 6:
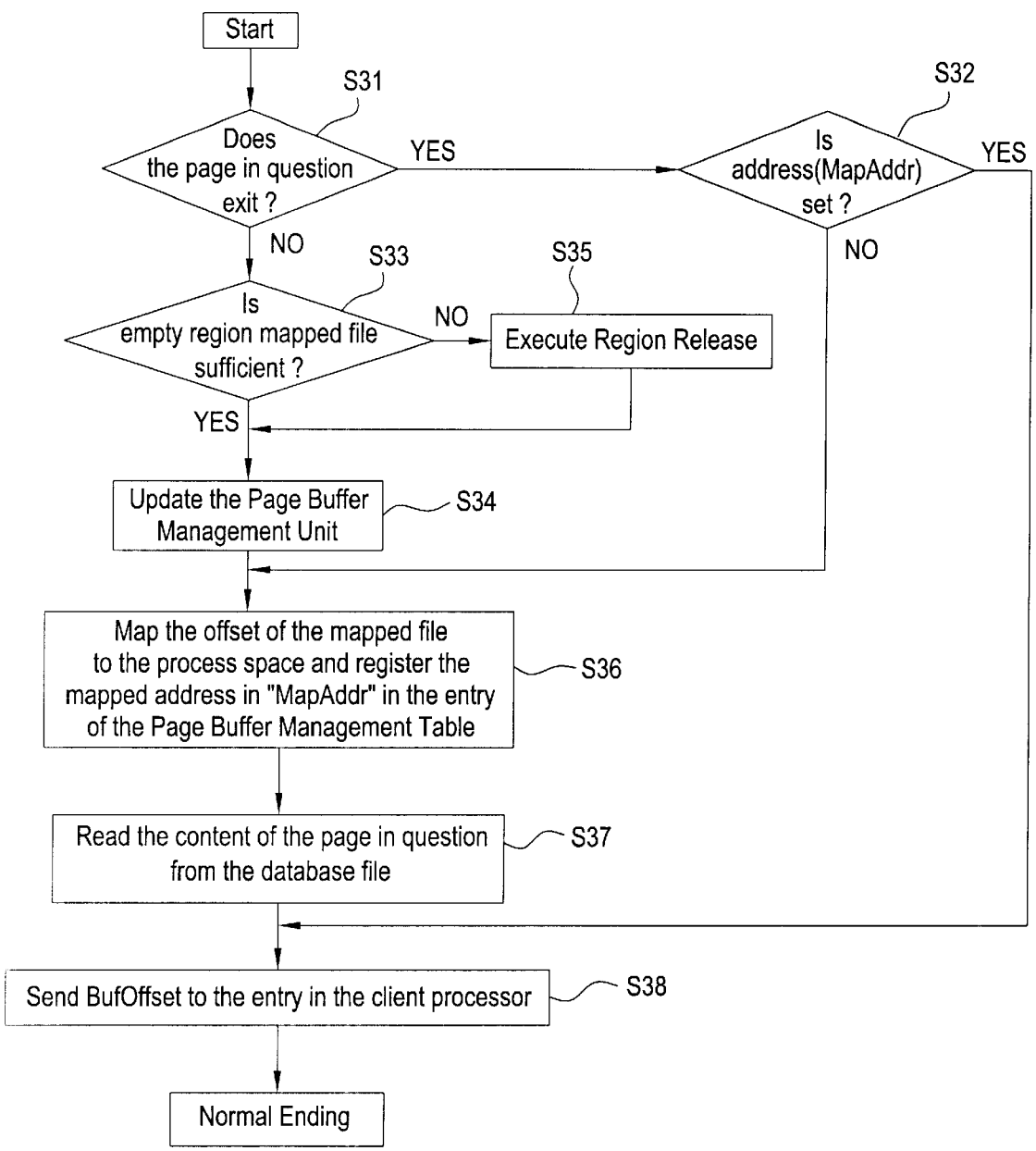
FIG. 6 is a flowchart describing the steps of reading a page in the page buffer reading function of the server process.

In the page writing process, the page buffer writing function 8, that is provided in the page buffer management unit 4 of the client process, executes the steps shown in FIG. 5.

In other words, if a certain page is needed to be written in the database file 21, a determination is made whether the entry of the page corresponding to the page buffer management table 6 exists (step S21). If the entry exists, verification is made whether the logic address "MapAddr" of the entry is set (step S22). As a result, if either entry does not exist or "MapAddr" is not set, the writing process for the page is already complete and the process is terminated.

On the other hand, if the entry exists and the "MapAddr" of the entry is set, the writing command including the "PageID" of the page in question is sent to the server process 11 (step S23) using the communication management unit 5.

Upon receiving the return signal from the process 11 for the writing command (step S24), the client process is ended if the return signal is a notification of the completion of the writing process.

On the other hand, if the return signal is an error (step S25), the current process is terminated at that point as abnormal. If the return signal is a request to release a region of the page buffer 32 (step S26), the entry of the page for which release is requested is searched in page buffer management table 6 with the page identifier "PageID," the mapping of the mapped file by the "MapAddr" of the entry is interrupted (step S27) and the process is completed by clearing the entry to an unused condition (step S28).

The release request is also sent from the server process 11 in conjunction with the process to be explained with reference to FIG. 8.

In other words, a determination is made whether the entry exists (step S31) in the page buffer management table 16 corresponding to the "PageID" contained in the command based on the reading command sent from the client process. If the entry exists, verification is made whether the logic address "MapAddr" of the entry is set (step S32). As a result, if the "MapAddr" is set, the contents of the page are read in the page buffer 32 indicated by the "MapAddr", the process is ended by returning the offset "BufOffset" of the entry to the client process as a mapped file offset (step S38).

On the other hand, if the entry does not exist, a determination is made whether the empty region of the page buffer 32 is sufficient (step S33). If the empty region is sufficient, the region is searched in the page buffer management table 16, the entry indicating the empty region is read and updated as the entry to be used by the requested page (step S34). Moreover, if the empty region is not sufficient, the process of FIG. 8 is executed to secure a sufficient empty region (step S35). Then updating of the page buffer management table 16 is executed (step S34).

After updating the page buffer management table 16 in the above manner, the mapped file offset specified by the "BufOffset" of the entry is mapped to the process space of the server process 11 and the logic address that is mapped is registered in the "MapAddr" of the entry (step S36). Then, the content of the page requested by the page buffer 32 specified by the "MapAddr" is read and stored (step S38) from the database file 21 and the process is ended by returning the "BufOffset" of the entry to the client process as a mapped file offset (step S38).

Figure 7:
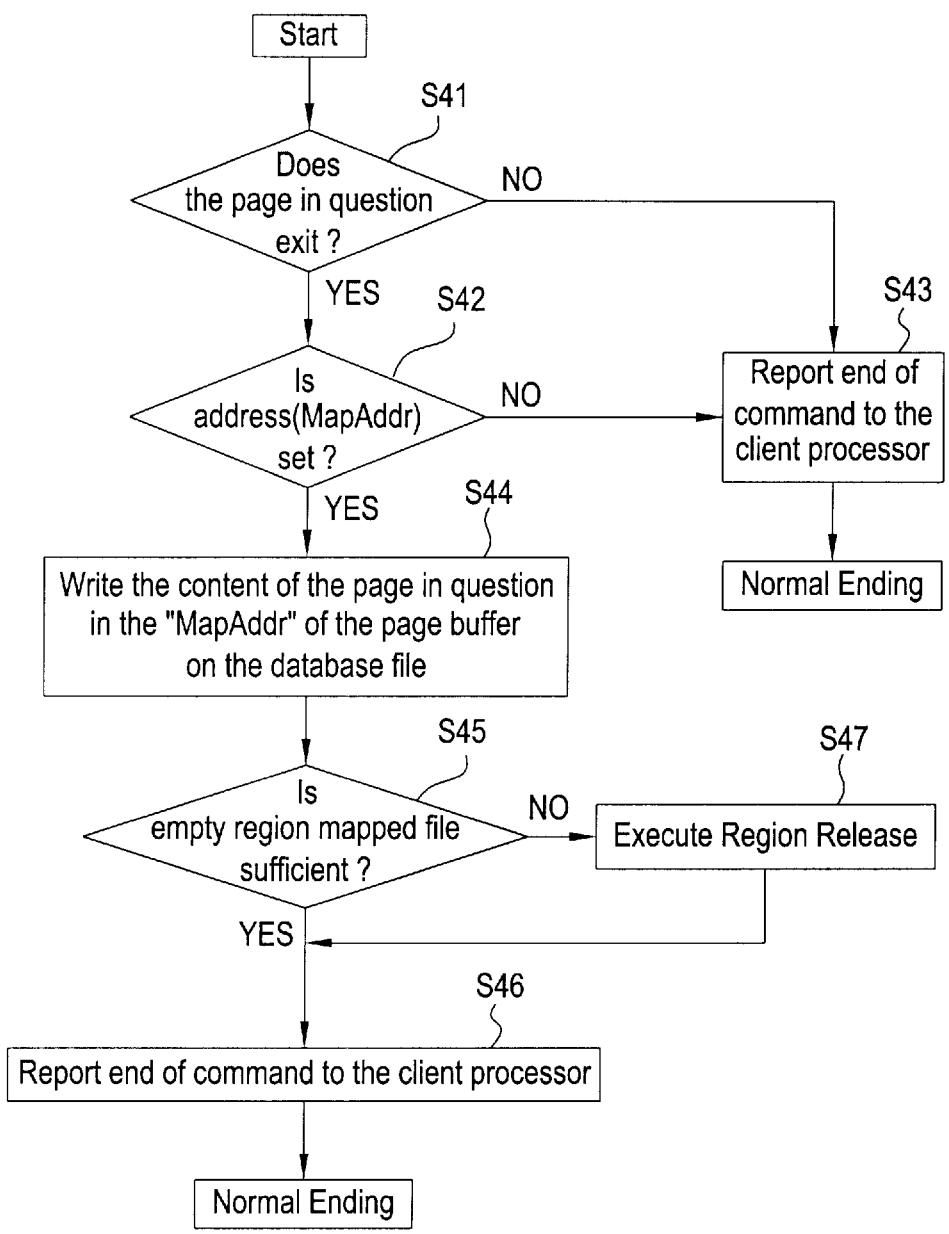
FIG. 7 is a flowchart describing the steps of writing a page in the page buffer reading function of the server process.

In the page writing process, the page buffer writing function 18 that is provided in the page buffer management unit 14 of the server process executes processes with the steps of FIG. 7.

In other words, a determination is made whether the entry corresponding to "PageID" included in the command exists in the page buffer management table 16 based on the writing command sent from the client process (step S41). If the entry exists, a verification is made whether the logic address "MapAddr" of the entry is set (step S42). As a result, if either the entry does not exist or "MapAddr" is not set, the writing process in the database file 21 concerning the page is complete. Hence, the process is ended by returning the signal indicating completion to the client process (step S43).

On the other hand, if the entry exists and the "MapAddr" is set, the content of the page specified by "MapAddr" of the entry is written in the database file 21 (step S44). Moreover, a determination is made whether the empty region of the page buffer 32 is sufficient in order to use the region for management thereafter. If it is not sufficient, the process is executed to release the region in the mapped file described in FIG. 8 and the notification of completion of the process including the release request in conjunction with the release process is returned to the client process (step S46).

As a result of the above determination, if a region does not exist that is not used by any client process, a determination is made whether expansion of the mapped file is possible (step S52). If expansion is possible, the page buffer management table 16 expands with the expansion process (step S53) and the process is terminated.

On the other hand, if neither of the above determinations (step S51, s52) hold, a determination is made whether a region exists in which only one client process is used based on the "UsingClient" column of the page buffer management table 16 (step S54). If such a region exists, the region of the entry is selected as a region to be released. Incidently, if a multiplicity of regions exist in this case, the region that has not been used for processing for the longest time is selected (step S56).

Moreover, if the above determination does not hold (step S54), the entry of the region that has not been used for processing for the longest time out of all the regions that are used by the multiplicity of client processes is selected (step S55). The release processing previously mentioned is executed for the entry selected (steps S55, S56) by notifying the client process that is using the release request specified by the "PageID" (step S57). At the same time, mapping of the entry to be released to the process space of the page buffer specified by the "MapAddr" is unmapped (step S58) in the server process 11. Also, the entry to be released is cleared and the process is ended (step S59).

In the above described region release process, the criteria for selecting the entry to be released is the number of the client processes being used and the period in which the client process is being used. The entry that has not been used for the longest time may be selected regardless of the number of the client processes. However, the page with the lower priority level corresponding to the entry should be first selected as the target of the release processing.

In the above described database management system, the client process and the server process include one information processing apparatus. The mapped file, being the same as the normal file, may be used in combination with a mechanism of the distributed file system such as a network file system. Therefore, by using a multiplicity of information processing apparatuses connected through the network, the client process and the server process may include separate information processing apparatus. However, in such case, the same internal memory cannot be shared physically as the page buffer 32. The page buffer 32 needs to be provided for each information processing apparatus.

Moreover, in the above explanation, an example is shown where the data is processed by a page as a unit. The present invention may be applied to a database management system that processes the data based on other concepts of a unit than a page.

By mapping the data stored in the shared memory device between the client process and the server process, the data is shared between these processes. Hence, the process time required for the data sharing process is substantially reduced compared to methods in which the data is transferred between the processes and the data is maintained by each process. Moreover, by making each process include one information processing apparatus, each process can use the same shared memory device, enabling the reduction in memory capacity needed for the process.

While the invention has been described in relation to preferred embodiments, many modifications are apparent from the description of the invention. All such modifications and variations are intended to be within the scope of the present invention as defined in the appended claims.

What is claimed is:

1. A database management system in which a server process part accesses a database based on a command from a client process part, the system comprising:

sharing memory means for sharing a memory region between the client process part and the server process part, the server process part comprising:

first receiving means for receiving a data reading command from the client process part, input/output means for reading the data specified by the data reading command from the database and for writing the specified data in the sharing memory means, and first sending means for sending a region identifier to the client process part that specifies the data written in the sharing memory means, the client process part comprising:

second sending means for sending the data reading command to the server process part, second receiving means for receiving the region identifier sent from the server process part, client side management means for enabling accessing by the client process part by mapping the region in the sharing memory means to the region in the client process part corresponding to the data specified by the region identifier, server side management means for storing an entry containing the data identifier to specify the data written in the sharing memory means and the identifier of the client process part mapping the data to manage the data written in the sharing memory means, and release means for releasing the entry with a lower data priority based on the information maintained by the server side management means and for providing the entry to the data management by the management means corresponding to the reading command from the client process part.

2. The database management system of claim 1, wherein the sharing memory means comprises at least an internal memory that stores the data read from the database and is accessed by the client process and an external memory that stores the data same as that in the internal memory, the first sending means sending an address of the external memory indicating the region where the data is stored as the region identifier, the client side management means mapping the region in the external memory indicated by the address of the external memory into the region of the internal memory indicated by the address that the client process uses to access the data.

3. The database management system of claim 2, wherein the client process part further includes determination means for determining whether the data is mapped to the client process part based on the information stored by the client side management means and for sending a reading command from the second sending means if the mapping is not performed.

4. The database management system of claim 3, wherein the information stored by the client side management means contains the data identifier to specify data and the address of the internal memory in the client process.

5. The database management system of claim 2, wherein the client process part and the server process part each reside on different information processing apparatus that are connected to each other,
wherein the internal memory section of the sharing memory means is provided for each of the information processing apparatuses of the client process part and the server process part, and
wherein the data stored in the internal memory is mapped into the data stored in the external memory.

6. The database management system of claim 1, wherein the server process part further comprises:
server side management means for managing the data written in the sharing memory means, and
determination means for determining whether the data specified by the data reading command is written in the sharing memory means based on the information stored by the server side management means and for making the input/output means read the data from the database and write the data into the sharing memory means if the data is not written in the sharing memory means.

7. The database management system of claim 6, wherein the information stored by the server side management means contains the data identifier that specifies the data written in the sharing memory means, the address that indicates the region of the external memory and the identifier of the client process to which the data is mapped.

8. A data management method where a server process writes data read from a database in a sharing memory device and the use of the data by the client process is enabled by mapping a region storing the data of the sharing memory device to a logical address of the client process, the method comprising the steps of:
determining by the client process whether the data is mapped,
sending commands from the client process to the server process to read the data if the data is not mapped,
determining by the client process whether the data specified by the data reading command exists in the sharing memory device,
reading the data specified from the database and writing the data to the sharing memory device if the specified data does not exist in the sharing memory device,
notifying the client process of the address in the sharing memory device where the server process writes in the data,
mapping the address into the logical address in the client process, and
releasing data with a lower data priority based on information from said server process.

9. The database management method of claim 8, further comprising the step of recording the identifier of the data mapped into the client process for utilizing in the determination in the client process and the step of writing the identifier of the data in the sharing memory device and the identifier of the client process on which the data are mapped to be used in the determination by the server process.

10. A database management system having a database that stores a plurality of pages each of which includes of a plurality of objects and is identified by a page identifier indicating a position where the page is stored in the database, the system comprising:
a server process part;
at least one client process part; and
a shared memory device connected to the server process part and the client process part;
wherein the server process part comprises:
a first receiving device connected to the client process part to receive a page reading command that includes the page identifier to read the page specified by the page identifier from the database;
an input/output device connected to the database, the input/output device reading the page specified by the page identifier and writing the specified page into a region in the shared memory device;
a server side management device including a memory, the server side management device storing into the memory a correspondence among 1) the page identifier, 2) a physical address of the region where the page read from the database is stored and 3) an identifier of the client process to which the page is mapped; and
a first sending device connected to the client process part, the first sending device sending the physical address; and wherein the client process part comprises:
a second sending device connected to the server process part to send the page reading command;
a second receiving device connected to the first sending device to receive the physical address sent from the server process part;
a client side management device that enables the client process part to access the page stored in the shared memory by mapping the region specified by the physical address in the shared memory device to the region in the client process part; and
an object manager that manages objects in the page stored in the shared memory.

11. The database management system of claim 10, wherein the shared memory device comprises at least an internal memory that stores the data read from the database and is accessed by the client process and an external memory that stores the data same as that in the internal memory, the first sending device sending the physical address of the external memory indicating the region where the page is stored, the client side management device mapping the region in the external memory indicated by the physical address of the external memory into the region of the internal memory by using a logical address that the client process uses to access the page in the internal memory.

12. The database management system of claim 11, wherein the client process part and the server process part each reside on different information processing apparatus that are connected to each other,
wherein the internal memory section of the sharing memory means is provided for each of the information processing apparatuses of the client process part and the server process part, and
wherein the data stored in the internal memory is mapped into the data maintained in the external memory.

13. The database management system of claim 10, wherein the server side management device searches the information stored in the memory to find a region in the shared memory which is mapped by only one client process part, releases a found region in the shared memory, and informs the only one client process part that mapped the region, of the release of the region.

14. The database management system as set forth in claim 13, wherein the first receiving device receives a page write command, that includes the page identifier, to write the page in the shared memory specified by the page identifier into the database;

the server side management device searches the information in the memory to find the page specified by the page identifier in the shared memory; and the input/output device writes a found page of the shared memory into the position corresponding to the page identifier in the database.

\* \* \* \* \*